(12) United States Patent
Mathur et al.

(10) Patent No.: US 8,092,285 B2
(45) Date of Patent: Jan. 10, 2012

(54) SYSTEM AND METHOD FOR CONTROLLING A VENTILATION UNIT OF A VEHICLE

(75) Inventors: Gursaran Das Mathur, Farmington Hills, MI (US); Carl Hugh Schell, Dearborn, MI (US)

(73) Assignee: Calsonickansei North America, Inc., Farmington Hills, MI (US)

( * ) Notice: Subject to any disclaimer, the term of this patent is extended or adjusted under 35 U.S.C. 154(b) by 1695 days.

(21) Appl. No.: 11/386,977

(22) Filed: Mar. 21, 2006

(65) Prior Publication Data
US 2007/0243808 A1 Oct. 18, 2007

(51) Int. Cl.
*B61D 27/00* (2006.01)
(52) U.S. Cl. .......................................... 454/75
(58) Field of Classification Search ....... 454/75
See application file for complete search history.

(56) References Cited

U.S. PATENT DOCUMENTS

| | | |
|---|---|---|
| 4,992,965 A | 2/1991 | Holter et al. |
| 5,725,425 A | 3/1998 | Rump et al. |
| 6,168,515 B1 * | 1/2001 | Daimon et al. ................ 454/75 |
| 6,758,739 B1 | 7/2004 | Sangwan et al. |
| 6,800,022 B2 | 10/2004 | Urbank et al. |

OTHER PUBLICATIONS

Tom Aiken, MOS Air Quality Sensors Make Vehicle Cabins Safer, (Sensorsmag.com), Feb. 2004, pp. 1-5, http://www.sensorsmag.com/articles/0204/40/main.shtml, Parsippany, NJ.

* cited by examiner

*Primary Examiner* — Steven B McAllister
*Assistant Examiner* — Samantha Miller
(74) *Attorney, Agent, or Firm* — Meschkow & Gresham, P.L.C.

(57) ABSTRACT

A sensor system (24) for controlling a ventilation unit (22) of a vehicle (20) includes a sensitivity selector (70) for enabling a user to select a setting (76) corresponding to an air quality threshold (94, 98), and an air quality sensor (62) proximate an exterior of the vehicle (20) for detecting an air quality parameter (71). A controller (66) is responsive to the selector (70) and the sensor (62), and is in communication with an inlet air valve (32) of the ventilation unit (22). A method (118) of operating the sensor system (24) entails receiving a current value of the air quality parameter (71) at the controller (66) for comparison with the air quality threshold (94, 98). The controller (66) generates a switch signal (74) in response to the comparison for adjusting the inlet air valve (32) between an outside air mode (44) and a recirculation mode (46).

14 Claims, 6 Drawing Sheets

| AIR QUALITY SETTING | QUALITY OF OUTSIDE AIR | VEHICLE SPEED (MPH) | AIR QUALITY THRESHOLD PPM CO/HC | AIR QUALITY THRESHOLD PPB NO$_x$ |
|---|---|---|---|---|
| 0 | INDISCERNIBLE POLLUTION | ≥60 | 0 | 0 |
| 1 | LIGHT POLLUTION | | 15 | 400 |
| 2 | MEDIUM POLLUTION | >35 AND <50 | 30 | 800 |
| 3 | MEDIUM-HIGH POLLUTION | | 40 | 1200 |
| 4 | HEAVY POLLUTION | ≤25 | 60 | 1600 |
| 5 | VERY HEAVY POLLUTION | | 80 | 2000 |

SYSTEM AND METHOD FOR CONTROLLING A VENTILATION UNIT OF A VEHICLE

TECHNICAL FIELD OF THE INVENTION

The present invention relates to the field of vehicular heating, ventilation, and air conditioning (HVAC) units. More specifically, the present invention relates to a system for controlling the ventilation unit of a vehicle for switching between an outside air mode and a recirculation mode.

BACKGROUND OF THE INVENTION

Drivers and their passengers are frequently exposed to the harmful pollutants and unpleasant odors of gasoline and diesel exhaust emissions. Levels of exhaust gases at major metropolitan intersections, in stop-and-go conditions, on congested freeways, in tunnels, or behind high-polluting vehicles, such as trucks or old cars, can be one hundred to one thousand times higher than concentrations of pollutants in the surrounding area. These pollutants include carbon monoxide (CO), hydrocarbons (HC), volatile organic compounds (VOC), nitrogen oxides ($NO_x$), and so forth. Unfortunately, high concentrations of these gases tend to penetrate the vehicle interior through the ventilation system, and can compromise the health of individuals.

Some auto manufacturers are now incorporating sensors into their new luxury passenger vehicles to monitor outside air quality and prevent noxious gases from entering the vehicle interior thereby improving cabin air quality. For example, when noxious gases are detected, a controller controls airflow into the cabin, or passenger compartment, by controlling the source of the air to switch an inlet air valve from an outside air mode to a recirculation mode, in which the cabin air is recirculated through the ventilation unit.

A problem that occurs with automated positioning of the inlet air valve based on air quality sensing is that the ventilation unit can repeatedly cycle between the outside air and the recirculation modes, particularly when the vehicle is operated in congested city traffic. Each opening and closing of the air inlet valve changes the HVAC noise level in the vehicle cabin. This changing noise level can be annoying to the vehicle occupants, and can cause excessive wear on the air inlet valve and its corresponding components. Moreover, automated positioning prevents the vehicle occupants from being able to make tradeoffs between their desired cabin air quality and an acceptable amount of cycling between the outside air and the recirculation modes.

In addition, conventional sensor systems do not make the distinction between driving conditions that typically experience lower pollutant levels, i.e., relatively high speed highway and/or rural driving, and those that typically experience higher pollutant levels, i.e., lower speed city driving. It may be desirable to vary the sensitivity of the sensor system in response to varying driving conditions and pollutant levels to more efficiently control cycling between the outside air and the recirculation modes.

Unfortunately, however, a vast majority of new and pre-owned passenger vehicles are not equipped with any such sensors, notwithstanding their limitations. Thus, concerned individuals have no option but to manually switch between an outside air mode and a recirculation mode when they determine that pollutant levels of the outside air are undesirably high. Although a driver could switch to recirculation mode manually, the driver may forget to switch back to outside air mode. By remaining in the recirculation mode, the windows could fog or the carbon dioxide level could increase resulting in a decrease in the oxygen level. Fogged windows and/or a decreased oxygen level in the cabin could compromise the safety of the driver and his or her passengers.

Furthermore, some gaseous pollutants are undetectable by humans. Therefore, the individual may not realize that the pollutant level within the vehicle interior has become undesirably high, and that he or she should switch to recirculation mode. Even when gaseous pollutants are detectable, the pollutant level in the vehicle may have already become excessively high by time the individual is finally able to detect it. As such, manually switching to recirculation mode once noxious odors are detected may be disadvantageous since there is already a significant quantity of pollutants in the recirculated air.

SUMMARY OF THE INVENTION

Accordingly, it is an advantage of the present invention that a sensor system and method for controlling between outside air and recirculation modes of a ventilation unit of a vehicle are provided.

It is another advantage of the present invention that a sensor system and method are provided in which the sensitivity of the sensor system to pollutants can be adjusted by a user;

Another advantage of the present invention is that a sensor system and method are provided in which the sensitivity of the sensor system to pollutants adapts to a current driving condition of the vehicle.

Yet another advantage of the present invention is that a sensor system is provided that is readily installed as an aftermarket device on new and pre-owned vehicles.

The above and other advantages of the present invention are carried out in one form by a sensor system for controlling a ventilation unit of a vehicle, the ventilation unit including an inlet air valve for switching between an outside air mode and a recirculation mode. The system includes a sensitivity selector for enabling a user to select an air quality threshold, and an air quality sensor proximate an exterior of the vehicle for detecting an air quality parameter. A controller is responsive to the sensitivity selector and the air quality sensor, and is configured for communication with the inlet air valve. The controller receives a current value of the air quality parameter for comparison with the air quality threshold, and the controller generates a switch signal in response to the comparison for adjusting the inlet air valve between the outside air mode and the recirculation mode.

The above and other advantages of the present invention are carried out in another form by a method of operating a sensor system to control a ventilation unit of a vehicle. The ventilation unit includes an inlet air valve for switching between an outside air mode and a recirculation mode, and the sensor system is in communication with the inlet air valve. The method calls for obtaining a manually selected setting corresponding to an air quality threshold at a controller of the sensor system, and storing the setting in a memory element associated with the controller. The method further calls for detecting a current value of an air quality parameter at an air quality sensor of the sensor system, and comparing the current value of the air quality parameter with the air quality threshold. When the current value exceeds the air quality threshold, a switch signal is generated to instruct the air inlet valve to switch to the recirculation mode, and when the current value is less than the air quality threshold, the switch signal is generated to instruct the air inlet valve to switch to the outside air mode.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
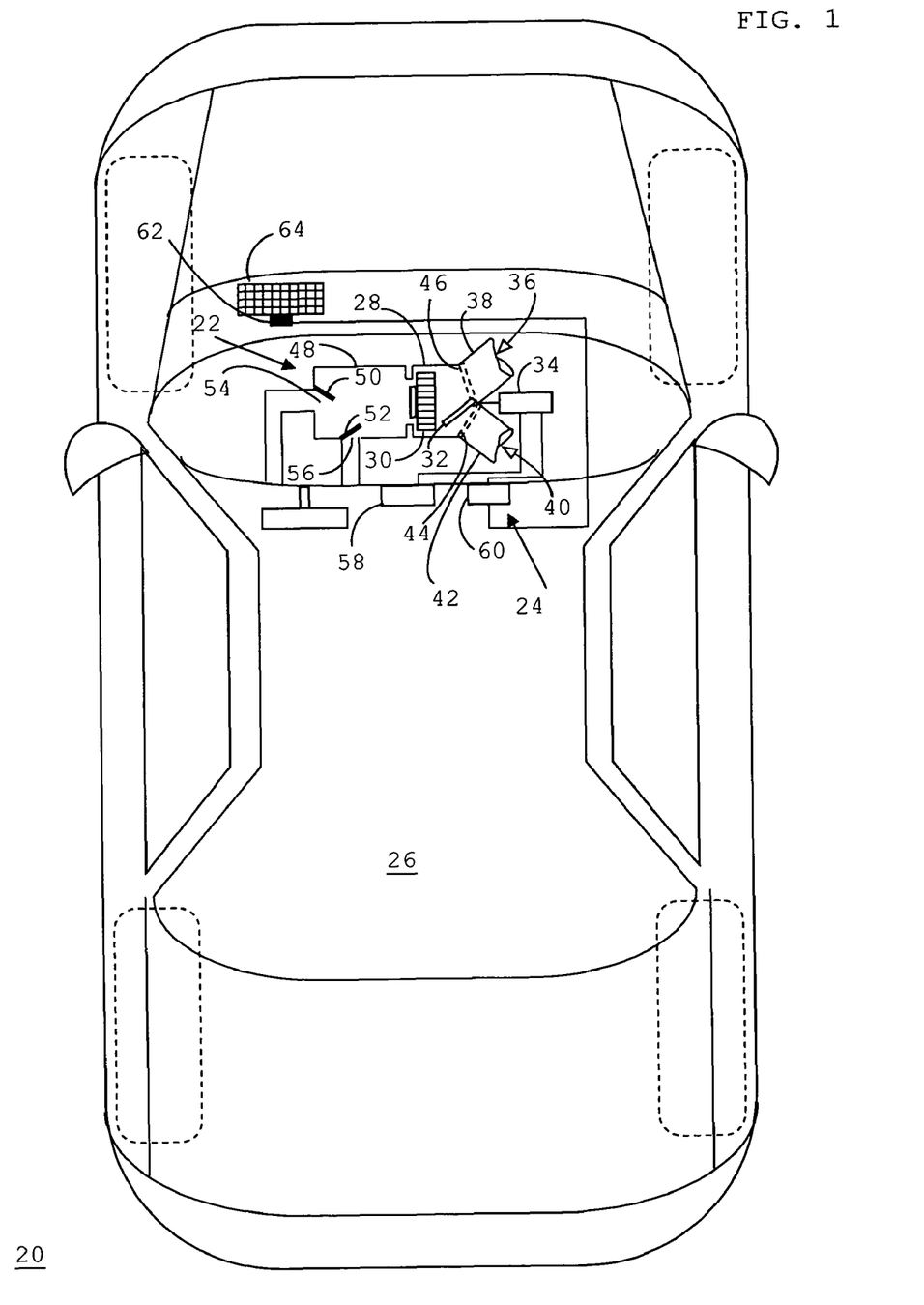
FIG. 1 shows a top schematic view of a vehicle having a ventilation unit controlled by a sensor system in accordance with a preferred embodiment of the present invention.

FIG. 1 shows a top schematic view of a vehicle 20 having a ventilation unit 22 controlled by a sensor system 24 in accordance with a preferred embodiment of the present invention. Vehicle 20 may be any passenger or cargo vehicle for which airflow to an interior compartment 26 is controlled. Ventilation unit 22 may be a conventional vehicular heating, ventilation, and air conditioning (HVAC) unit. However, that is not a limitation of the present invention. Rather, ventilation unit 22 may simply include means for selectively enabling inlet of outside air or recirculated air from interior compartment 26, as well known to those skilled in the art. Accordingly, only those elements of ventilation unit 22 that are pertinent to the present invention are described herein.

Ventilation unit 22 includes an air intake duct 28 having an inlet air blower 30 driven by a blower motor (not shown) to force inlet air past additional elements of ventilation unit 22, such as a filter and evaporator (not shown). Air intake duct 28 is bifurcated upstream, and an inlet air valve 32 is adjustable by an actuator 34, such as a servo motor to control the source of the inlet air. Depending on the position of inlet air valve 32, outside air, as indicated by an arrow 36, may enter air intake duct 28 through a first duct leg 38 or recirculated air, as indicated by an arrow 40, from interior compartment 26 may enter air intake duct 28 through a second duct leg 42.

For purposes of this disclosure, air inlet valve 32 is considered to be switched to an outside air mode 44 when second duct leg 42 is fully restricted so that only outside air 36 enters air intake duct 28. Conversely, air inlet valve 32 is considered to be switched to a recirculation mode 46 when first duct leg 38 is fully restricted so that only recirculated air 40 enters air intake duct 28.

An air outlet duct 48 is disposed on the downstream side of blower 30. Air outlet duct 48 typically houses a heater core (not shown) and a re-heat valve (not shown) that is adjustable to control how much of the air must pass through the heater core. The heated and un-heated air portions are mixed in the air outlet duct 48 downstream of the re-heat valve, and mode control valves 50, 52 direct the mixed air through one or more outlets 54, 56 per conventional processes.

Vehicle 22 further includes a control head 58. Control head 58 is a conventional dashboard mounted assembly which houses the mode selector (for selecting between outside air 36, recirculated air 40, defrost mode, and so forth), the blower switch, air conditioner switch, and the temperature control lever of ventilation unit 22. For purposes of the present invention, control head 58 is in communication with actuator 34 for controlling the position of inlet air valve 32 for manually switching between outside air mode 44 and recirculation mode 46.

Sensor system 24 includes a control unit 60 in communication with an air quality sensor 62. In a preferred embodiment, control unit 60 is an enclosure that resides within interior compartment 26 of vehicle 20 so that a driver of vehicle 20 can readily access it. Control unit 60 is in communication with actuator 34 of ventilation unit 22. Air quality sensor 62 may be mounted in a number of positions proximate an exterior of vehicle 20 that are subjected to outside air 36, such as near a cowl cover 64, as shown, or at the bumper or front end of vehicle 20.

In general, control unit 60 regulates the position of inlet air valve 32 in response to an air quality parameter detected by air quality sensor 62 so as to control the admission of polluted air into the inlet air stream. The admission of polluted air is controlled by user preference (discussed below) as well as by a particular driving condition in which vehicle 20 is being driven.

Figure 2:
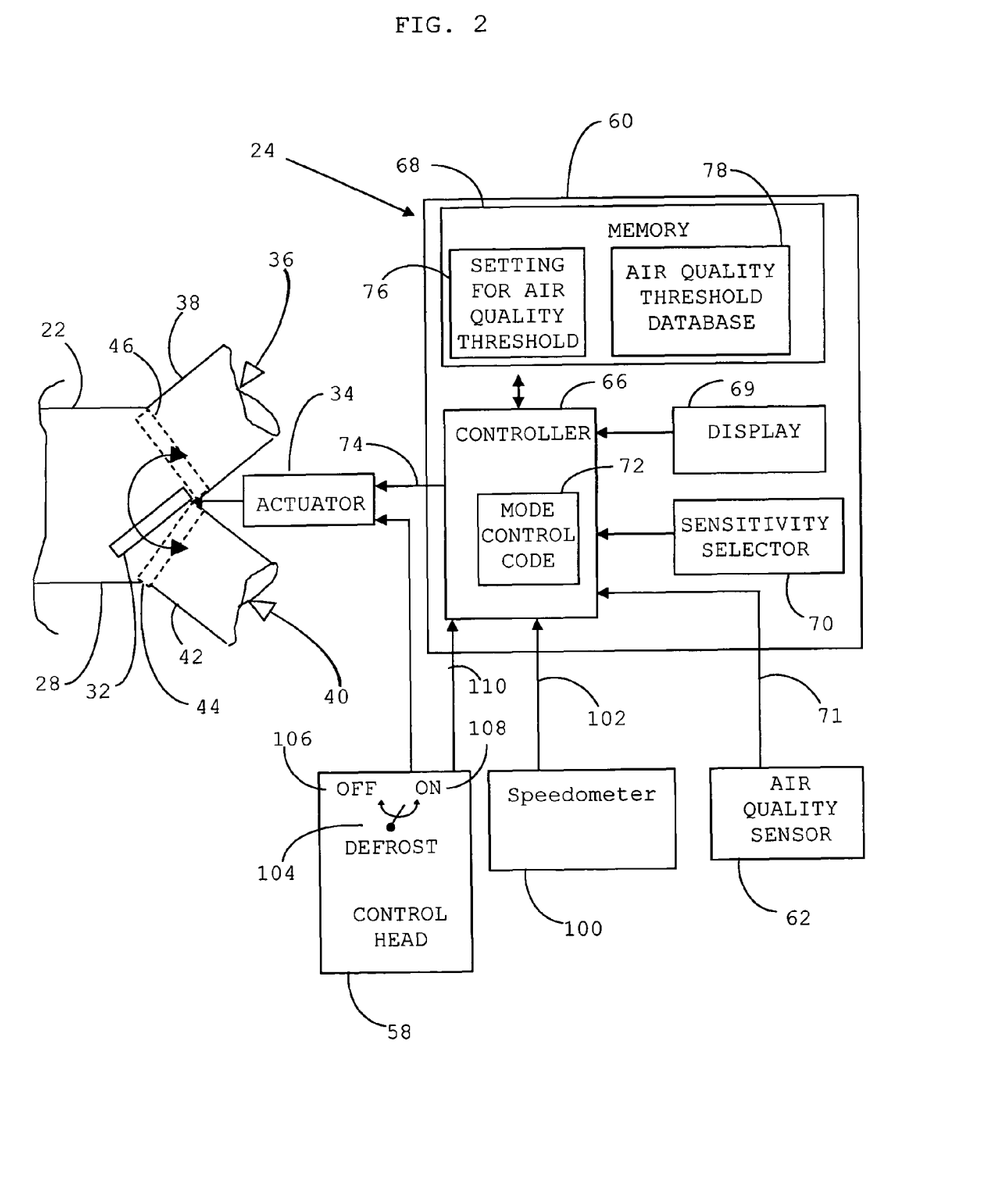
FIG. 2 shows a block diagram of the sensor system of the present invention in communication with the vehicular ventilation system.

FIG. 2 shows a block diagram of sensor system 24 in communication with the vehicular ventilation unit 22, of which a portion is shown. Control unit 60 contains a controller 66. A memory element 68, a display 69, and a sensitivity selector 70 are in communication with controller 66. Air quality sensor 62, also in communication with controller 66, provides current values of an air quality parameter, represented by an arrow 71, to controller 66.

Air quality sensor 62 encompasses a number of known and upcoming sensor elements that are capable of identifying oxidizable gases (carbon monoxide CO, gasoline, benzene, and so forth) and/or reducible gases (nitrogen oxides ($NO_x$). Air quality parameter 71 represents data indicating a current detectable level of these pollutants in outside air 36.

Controller 66 executes mode control code 72. Mode control code 72 is an executable computer program that is configured to control ventilation unit 22. More particularly, controller 66 is in communication with actuator 34 of ventilation unit 22, and mode control code 72 operates to generate a switch signal, represented by an arrow 74, to adjust inlet air valve 32 between outside air mode 44 and recirculation mode 46 in response to current values of air quality parameter 71.

Memory element 68 stores a setting 76 corresponding to an air quality threshold (discussed below), and memory element 68 stores an air quality threshold database 78. Sensitivity selector 70 enables a user to view the options for setting 76 on display 69 and manually select setting 76 from air quality threshold database 78 corresponding with an air quality threshold for storage in memory element 68.

Figure 3:
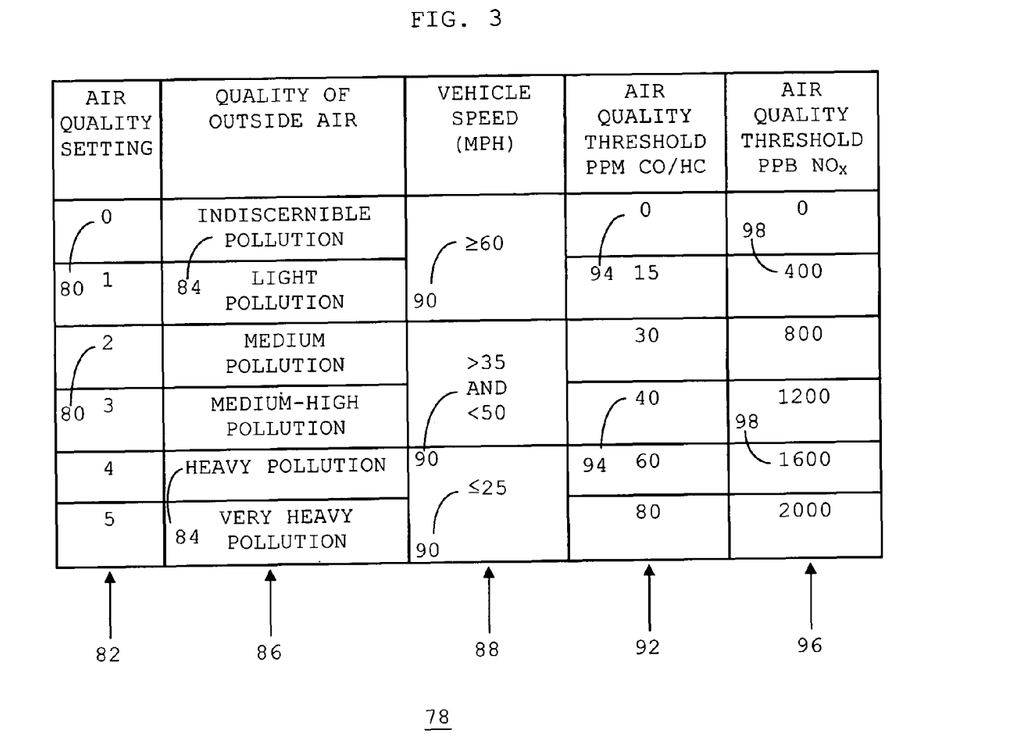
FIG. 3 shows a table of an exemplary air quality threshold database stored in a memory element of the sensor system.

Referring to FIG. 3, in connection with FIG. 2, FIG. 3 shows a table of an exemplary air quality threshold database 78 stored in memory element 68 of sensor system 24. Database 78 shows a number of possible setting options 80 (numbered zero through five) for setting 76 in a first column 82 and, for clarity, their corresponding textual descriptions 84 of the quality of outside air 36 in a second column 86.

In addition, a third column 88 of exemplary air quality threshold database 78 shows speed ranges 90 for establishing a relationship between vehicle speed and possible setting options 80 for setting 76. A fourth column 92 of database 78 shows an air quality threshold 94 for CO/HC corresponding to each setting-option 80, and a fifth column 96 of database 78 shows an air quality threshold 98 for nitrogen oxides ($NO_X$) corresponding to each setting option 80.

In this exemplary embodiment, each setting option 80 is a number from zero through five, where zero represents indiscernible pollution as described in second column 86, and five represents very heavy pollution also as described in second column 86. Sensitivity selector 70 allows a user to toggle through setting options 80 until the user decides how much pollution must be present in outside air 36 before controller 66 generates switch signal 74 to adjust inlet air valve 32 from outside air mode 44 to recirculation mode 46.

It is possible that when a user selects setting 76 that represents greater sensitivity to pollutants, i.e., a low number for setting option 80, inlet air valve may repeatedly cycle between outside air mode 44 and recirculation mode 46. If a user finds the repeated cycling troublesome, the user is able to select setting 76 that represents lower sensitivity to pollutants, i.e., a higher number of setting option 80. Conversely, for the user who desires lower pollutants within interior compartment 26 (FIG. 1), and is untroubled by the potential for repeated cycling, the user is able to select setting 76 that represents higher sensitivity to pollutants, i.e., a lower number of setting option 80. Consequently, sensor system 24 is readily customizable by the individual.

In addition to manually selecting setting 76, the present invention may automatically control the admission of polluted air by a particular driving condition in which vehicle 20 is being driven. Automatic control may be in effect when a user has not selected setting 76. A subsequent manual selection of setting 76 may then override automatic control. In an exemplary situation, the particular driving condition may be the current speed at which vehicle 20 is being driven (discussed below).

Air quality thresholds 94 and 98 define a maximum amount of pollution detectable by air quality sensor 62 that is allowable at each setting option 80 and/or relative to a particular vehicle speed range 90. When current values of air quality parameter 71 detected at air quality sensor 62 exceeds a particular one of thresholds 94 and 98, controller 66 generates switch signal 74 to adjust inlet air valve 32 from outside air mode 44 to recirculation mode 46.

Referring again to FIG. 2 in connection with FIG. 3, a vehicle speedometer 100 is in communication with controller 66 for providing a current speed, as represented by an arrow 102, to controller 66. The provision of current speed 102 enables controller 66 to select air quality thresholds 94 and 98 in connection with how fast vehicle 20 is traveling when automatic control is in effect. By way of example, a high speed situation may be designated as a condition in which vehicle 20 is traveling at vehicle speed range 90 in excess of a high speed threshold level (ex., sixty miles per hour) for a minimum of a predetermined duration (ex., ten minutes). Similarly, a low speed situation may be designated as a condition in which vehicle 20 is traveling at vehicle speed range 90 below a low speed threshold level (ex., twenty-five miles per hour) for a minimum of the predetermined duration. A medium speed situation may be designated as a condition in which vehicle 20 is traveling at vehicle speed range 90 between mid-range thresholds (ex., greater than thirty-five miles per hour and less than fifty miles per hour).

In general, when the current speed of vehicle 20 is high, the level of outside pollution may be indiscernible or light because vehicle 20 is less likely to be in a congested area.

Conversely, when the current speed of vehicle 20 is low, the level of outside pollution may be heavy or very heavy because vehicle 20 is likely to be in a congested area of a highway, on local roads, or traveling at peak traffic hours. At medium speed ranges, the level of outside pollution may be medium or medium-high. Consequently, air quality thresholds 94 and 98 may be adjustable based upon a current speed of vehicle 20 to account for these varying pollution levels responsive to traffic conditions.

Air quality threshold 94 for vehicle speed range 90 in excess of sixty miles per hour, shown in fourth column 92, is lower than air quality threshold 94 for vehicle speed ranges 90 of medium (ex., greater than thirty-five miles per hour and less than fifty miles per hour) and low speed situations (ex., less than twenty-five miles per hour) also shown in fourth column 92. In this exemplary-scenario, air quality threshold 94 for the high speed situation is significantly lower than that of air quality threshold 94 for lower speed situations. Consequently, sensor system 24 reacts more sensitively to detected pollutants in areas with generally unpolluted clean air, and less sensitively to detected pollutants in areas with higher pollution concentrations. Such an alteration in the sensitivity of the sensor system 24 may be useful to achieve a balance between operational time of ventilation unit 22 in recirculation mode 46 and operational time of ventilation unit 22 in outside air mode 44. This balance may limit the operational time of ventilation unit 22 in recirculation mode 46 where conditions are highly polluted, so that passenger-produced moisture and odors from interior compartment 26 (FIG. 1) are reliably removed, and to avoid the occurrence of increasing carbon dioxide levels and the commensurately decreasing oxygen levels within vehicle 20 (FIG. 1) caused by an extended period of ventilation unit 22 operating in recirculation mode 46.

The values presented in air quality threshold database 78 for vehicle speed range 90 and air quality thresholds 94 and 98 are for illustrative purposes. Those skilled in the art will recognize that vehicle speed range 90 and air quality thresholds 94 and 98 can take on a variety of values other than those shown. Alternatively, other considerations may be taken into account to determine the appropriate air quality thresholds 94 and 98, such as current temperature, air quality within interior compartment 26, user selection of the appropriate mode, and so forth.

Referring back to FIG. 2, control head 58 is also in communication with controller 66. Control head 58 includes, among other things, a mode selector 104 for switching between a defrost "OFF" position 106 and a defrost "ON" position 108. Control head 58 and mode selector 104 are shown as being highly simplified herein for clarity of illustration. However, it should be readily apparent to those skilled in the art that that a conventional control head will have several additional controls for blower speed, heat control, air conditioning on/off, and so forth. In addition, mode selector 104 is likely to include many positions to select between particular mode control valves 50, 52 (FIG. 1), defrost, and so forth.

Control head 58 provides a defrost signal, as represented by an arrow 110, to controller 66. When a driver's window is foggy or frosty, ventilation unit 22 should be in outside air mode 44 to dilute the build-up of moisture within interior compartment 26 (FIG. 1). Hence, if the driver has some fog on the inside of the windshield, the driver will adjust mode selector 104 to defrost ON position 108 on control head 58. In this scenario, controller 66 receives defrost signal 110 to indicate that control via control head 58 overrides signals generated by controller 66.

Figure 4:
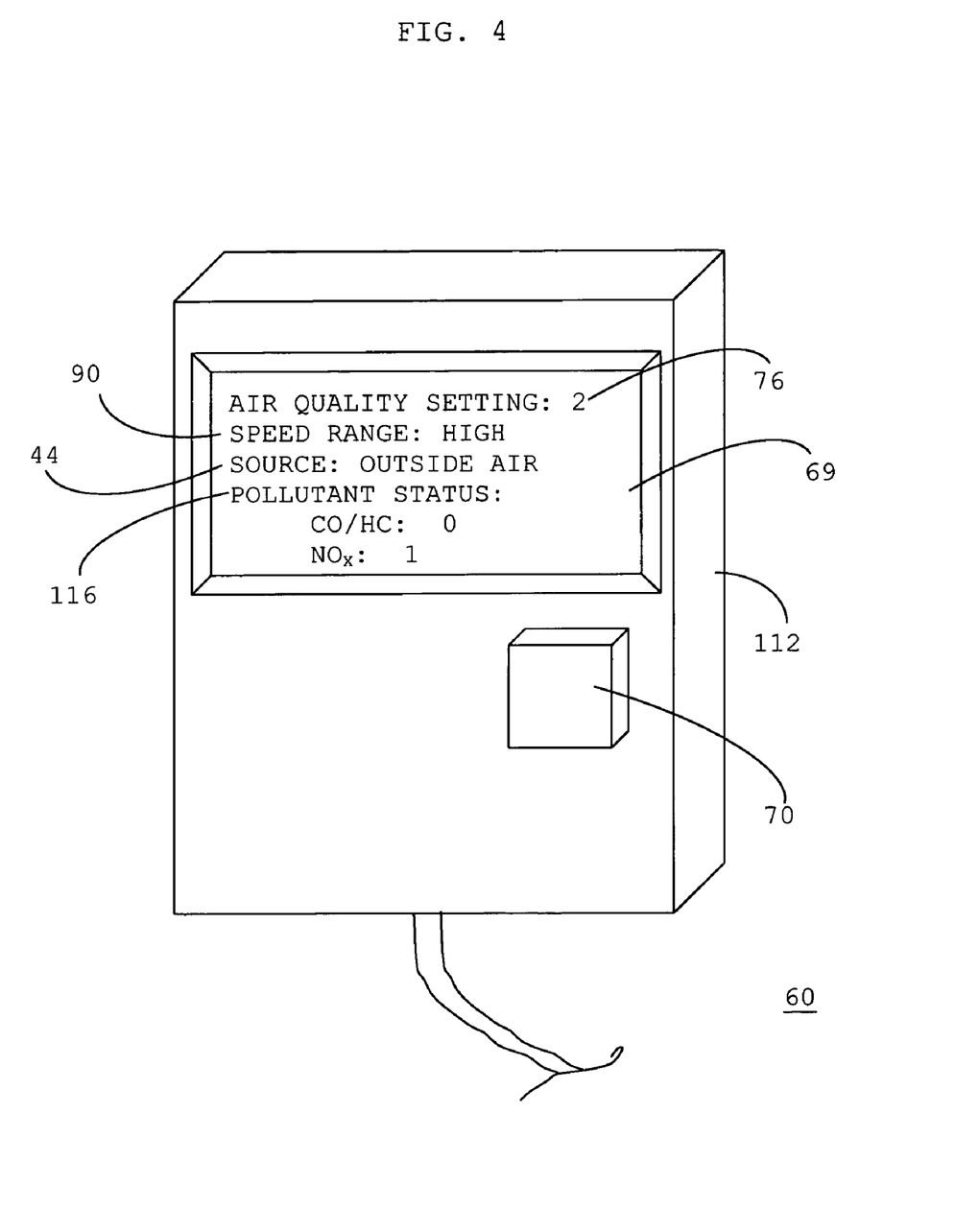
FIG. 4 shows a perspective view of an exemplary sensor system control unit.

FIG. 4 shows a perspective view of an exemplary sensor system control unit 60. Sensor system control unit 60 includes an enclosure 112 for housing controller 66, memory element 68, display 69, and sensitivity selector 70 (FIG. 2). In this exemplary embodiment, sensitivity selector 70 is merely a pushbutton switch that enables a user to toggle between setting options 80 (FIG. 3) to select setting 76.

During manual operation, display 69 provides setting 76 selected by the user, in this case "2" of setting operation 80 corresponding to textual description 84 (FIG. 3) of "light pollution." Display 69 may also present the current driving condition, i.e., vehicle speed range 90, of vehicle 20 (ex. high speed), the current air source, i.e., outside air mode 44, and a current pollutant status 116. In this instance, current pollutant status 116 provides a translation of the current values of air quality parameter 71 (FIG. 2) related to setting 76 for the user's perusal. That is, instead of the current values of air quality parameter which may correspond to a value in units of parts per million (PPM) or parts per billion (PPB), the current pollutant status 116 mimics setting 76 for ease of understanding. For example, current pollutant status 116 of CO/HC is "0", indicating an indiscernible pollution condition of the oxidizing gases carbon monoxide and hydrocarbons. In addition, current pollutant status 116 of $NO_X$ is "1", indicating a light pollution condition of the reducible gases nitrogen oxides. The text presented on display 69 varies in connection with changing conditions so that a user is kept apprised of the selected air quality setting 76, the current driving condition of vehicle 20 (FIG. 1), the operational mode of ventilation unit 22 (FIG. 1), and the current condition of outside air 36 (FIG. 1).

Figure 5:
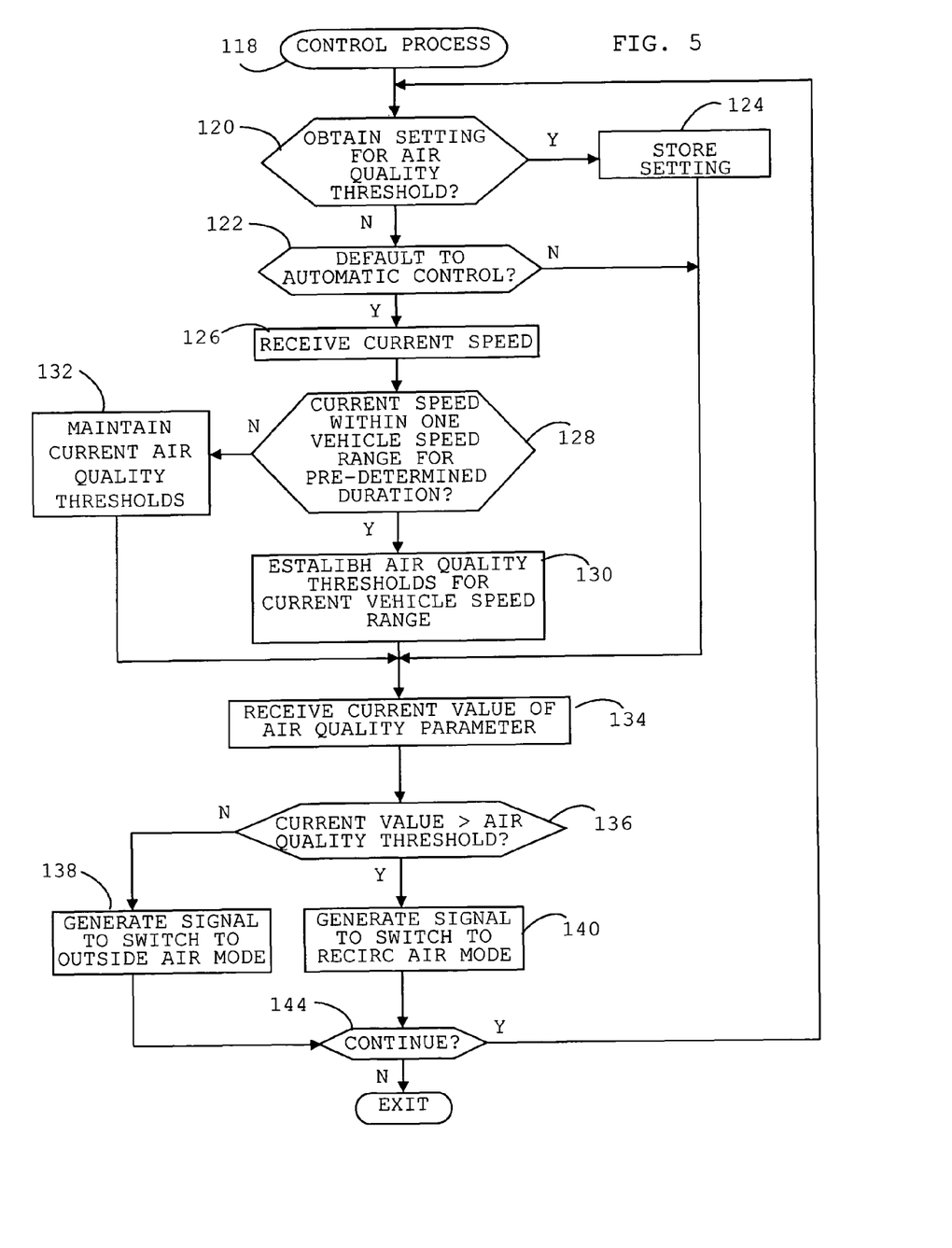
FIG. 5 shows a flowchart of a control process performed by the sensor system through the execution of mode control code.

FIG. 5 shows a flowchart of a control process 118 performed by the sensor system 24 (FIG. 1) through the execution of mode control code 72 (FIG. 2). Control process 118 is automatically initiated whenever vehicle 20 (FIG. 1) is first started.

Control process 118 begins with a query task 120. At query task 120, controller 66 makes a determination as to whether setting 76 corresponding to a particular desired air quality threshold is obtained. That is, query task 120 determines whether activation of sensitivity selector 70 (FIG. 2) by a user is detected. The user discussed herein is preferably the driver and/or a passenger of vehicle 20. However, the user may alternatively be the installer of sensor system 24.

Figure 6:
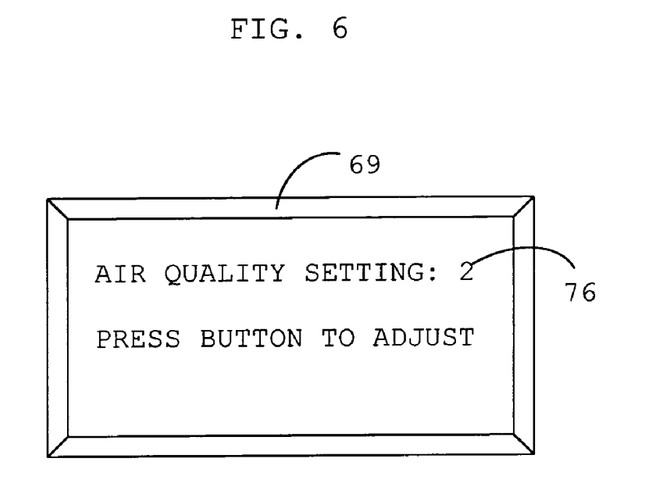
FIG. 6 shows a schematic view of a display of a sensor system control unit presenting an air quality setting adjustment.

Referring to FIG. 6 in connection with query task 120, FIG. 6 shows a schematic view of display 69 of sensor system control unit 60 (FIG. 2) presenting an air quality setting adjustment. As shown, straightforward text is provided to instruct the user to press the button (i.e., sensitivity selector 70) to adjust the air quality setting. As shown, setting 76 is set to "2." Those skilled in the art will recognize that the text presented on display 69 can vary greatly from that which is shown.

With reference back to control process 118 of FIG. 5, when query task 120 determines that setting 76 has not been obtained, program control proceeds to a query task 122 (discussed below). However, when query task 120 determines that setting 76 has been obtained, program control proceeds to a task 124. At task 124, controller 66 stores this updated setting 76 in memory element 68. Following task 124, program control proceeds to a task 134 (discussed below).

At query task 122, when setting 76 has not been obtained, controller 66 determines whether to default to automatic control of air quality thresholds 94 and 98 (FIG. 3) in response to current vehicle speed. A default to automatic control may be desirable when vehicle 20 is first turned on, after some pre-determined timeout period, and so forth. When controller 66 determines at query task 122 not to default to automatic control, program control proceeds to task 134 (discussed below).

When controller 66 determines at query task 122 to default to automatic control, program control proceeds to a task 126. At task 126, controller 66 receives current speed 102 (FIG. 2) of vehicle 20 from speedometer 100 (FIG. 2).

With this information acquired, program control proceeds to a query task 128. At query task 128, through internal timing processes, controller 66 determines whether current speed 102 is within one vehicle speed range 90 (FIG. 3) for at least a pre-determined duration. In an exemplary situation, when controller 66 determines that the current driving condition of vehicle 20 (FIG. 1) is one in which vehicle 20 is traveling at current speed 102 of greater than sixty miles per hour for a predetermined duration of at least ten minutes, control process 118 proceeds to a task 130.

At task 130, controller 66 establishes air quality thresholds 94 and 98, respectively (FIG. 3) for the current vehicle speed range 90.

However, at query task 128 when controller 66 determines that current speed 102 is not within one vehicle speed range 90 (FIG. 3) for at least a pre-determined duration, process 118 proceeds to a task 132. At task 132, controller 66 determines that driving conditions have not changed significantly, so sensor system continues to operate at the current air quality thresholds 94 and 96, respectively.

Tasks 120, 122, and 124 enable the selection of a potentially maximum level of pollution that is acceptable within interior compartment 26 (FIG. 1) of vehicle 20 (FIG. 1) in accordance with pollutant levels of outside air 36 (FIG. 2). Setting 76 can be varied when a driver first starts vehicle 20, or any time thereafter.

Following any of tasks 124, 130, and 132, or a negative response to query task 126, control process 118 proceeds to task 134. At task 134, controller 66 receives a current value of air quality parameter 71 (FIG. 2) from air quality sensor 62 (FIG. 2).

In response to task 134, a query task 136 is performed. Now that controller 66 has determined the appropriate air quality thresholds, query task 136 makes a comparison between the current values of air quality parameter 71 (FIG. 2) received at task 134 and the appropriate air quality thresholds 94 and 98, respectively (FIG. 3).

For purposes of illustration, this disclosure presumes the conditions shown in display 69 of FIG. 4. That is, setting 76 is "2", the current driving condition of vehicle 20 (FIG. 1) is high speed, the current air source is outside air 36 in outside air mode 44, and a current pollutant status 116 is lower than setting 76. In this example, the current value of air quality parameter 71 represented by pollutant status 116 is lower than thresholds 94 and 98 corresponding with setting 76 of "2."

When the current values of air quality parameter 71 is less than the air quality thresholds at query task 136, process 118 continues with a task 138. At task 138, controller 66 generates switch signal 74 (FIG. 2) to instruct inlet air valve 32 to switch to outside air mode 44 (FIG. 2). Switch signal 74 is communicated to actuator 34 (FIG. 2) to control inlet air valve 32 as appropriate, either by maintaining or adjusting inlet air valve 32 in a fully restricted position over second duct leg 42.

However, when the current value of air quality parameter 71 is equal to or greater than the air quality thresholds 94 and 98 at query task 136, process 118 continues with a task 140. At task 140, controller 66 generates switch signal 74 (FIG. 2) to instruct inlet air valve 32 to switch to recirculation mode 46 (FIG. 2). Switch signal 74 is communicated to actuator 34

(FIG. 2) to control inlet air valve 32 as appropriate, either by maintaining or adjusting inlet air valve 32 in a fully restricted position over first duct leg 38.

Figure 7:
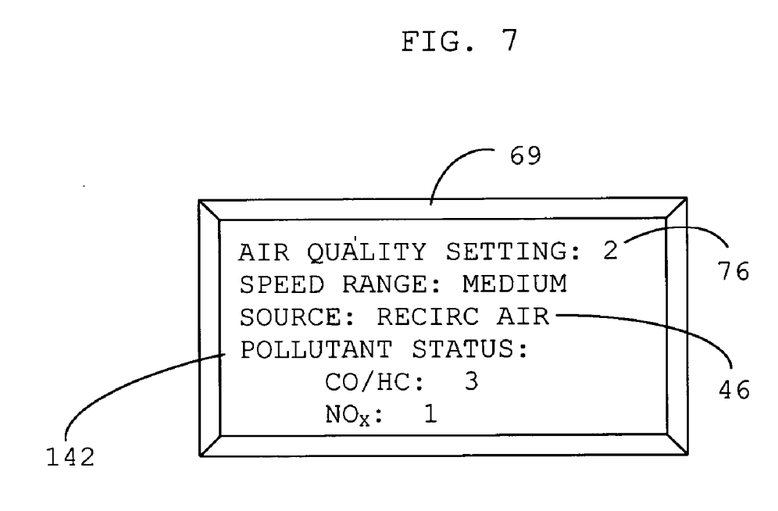
FIG. 7 shows a schematic view of the display of the sensor system control unit 60 with updated information.

Referring to FIG. 7 in connection with task 140, FIG. 7 shows a schematic view of display 69 of sensor system control unit 60 (FIG. 1) with updated information. In this case, setting 76 remains "2", whereby air quality thresholds 94 and 98 (FIG. 3) related to setting option 80 (FIG. 3) for "2" are utilized. The current air source is recirculated air 40 in recirculation mode 46, and a current pollutant status 142 of outside air 36 is higher than setting 76. In this example, the current value of air quality parameter 71 represented by pollutant status 142 reveals that the pollutant status for CO/HC is higher than air quality threshold 94 (FIG. 3) for CO/HC, although the pollutant status for $NO_X$ is lower than air quality threshold 98 (FIG. 3) corresponding with setting 76 of "2." Consequently, inlet air valve 32 has been adjusted to recirculation mode 46 so that the source of air for interior compartment 26 (FIG. 1) is recirculated air 40 (FIG. 1).

Following either of switch signal tasks 138 and 140, control process 118 proceeds to a query task 144. Query task 144 determines whether control process 118 is to continue. Control process 118 continues as long as vehicle 20 (FIG. 1) is powered on. While vehicle 20 remains on, program control loops back to query task 120 to monitor setting 76, air quality parameter 71, current speed 102, and to appropriately signal inlet air valve 34 to switch between outside air mode 44 and recirculation mode 46.

In summary, the present invention teaches of a sensor system and method for controlling between outside air and recirculation modes of a ventilation unit of a vehicle. The sensor system includes a sensitivity selector so that the sensitivity of the sensor system to pollutants can be adjusted by a user. In addition, the sensitivity of the sensor system to pollutants adapts to a current driving condition of the vehicle by the adjustment of air quality thresholds. As such, the sensor system becomes more sensitive to pollutants in higher speed conditions, and the sensor system becomes less sensitive to pollutants in lower speed conditions. The sensor system is of a uncomplicated design and is a stand alone unit, i.e., it is not incorporated into the HVAC system, so that it can be readily installed as an aftermarket device on new and pre-owned vehicles.

Although the preferred embodiments of the invention have been illustrated and described in detail, it will be readily apparent to those skilled in the art that various modifications may be made therein without departing from the spirit of the invention or from the scope of the appended claims. For example, there can be great variation in the order of tasks performed and/or the presentation of information on the display.

What is claimed is:

1. A sensor system for controlling a ventilation unit of a vehicle, said vehicle including a speedometer for measuring a current speed of said vehicle, said ventilation unit including an inlet air valve for switching between an outside air mode and a recirculation mode, and said system comprising:
   a sensitivity selector for enabling a user to select an air quality threshold;
   an air quality sensor proximate an exterior of said vehicle for detecting an exterior air quality parameter;
   a controller responsive to said sensitivity selector and said air quality sensor, said controller being configured for communication with said inlet air valve, said controller being further configured to receive said current speed and adjust said air quality threshold in response to said current speed, said controller receiving a current value of said air quality parameter for comparison with said air quality threshold, and said controller generating a switch signal in response to said comparison for adjusting said inlet air valve between said outside air mode and said recirculation mode.

2. A sensor system as claimed in claim 1 further comprising an enclosure for placement in a interior compartment of said vehicle, said enclosure housing said sensitivity selector and said controller.

3. A sensor system as claimed in claim 1 wherein said sensitivity selector comprises a manually actuated switch for entering a setting corresponding to said air quality threshold.

4. A sensor system as claimed in claim 3 further comprising a memory element for storing said setting.

5. A sensor system as claimed in claim 1 further comprising a display for presenting a current status of said outside air mode and said recirculation mode.

6. A sensor system as claimed in claim 1 wherein when said current speed is above a speed threshold, said air quality threshold is adjusted to a lower value than when said current speed is below said speed threshold.

7. A sensor system as claimed in claim 1 wherein said controller adjusts said air quality threshold after said current speed of said vehicle remains above a speed threshold for a predetermined duration.

8. A sensor system as claimed in claim 1 wherein when said current value of said air quality parameter exceeds said air quality threshold, said switch signal instructs said inlet air valve to switch to said recirculation mode, and when said current value is less than said air quality threshold, said switch signal instructs said inlet air valve to switch to said outside air mode.

9. A sensor system as claimed in claim 1 wherein said vehicle includes a mode selector for manually switching to a defrost mode, and said controller is adapted to receive a defrost signal when said mode selector is switched to said defrost mode, said defrost signal overriding said switch signal.

10. A method of operating a sensor system to control a ventilation unit of a vehicle, said ventilation unit including an inlet air valve for switching between an outside air mode and a recirculation mode, said sensor system being in communication with said inlet air valve, and said method comprising:
   obtaining a manually selected setting corresponding to an air quality threshold at a controller of said sensor system;
   storing said setting in a memory element associated with said controller;
   receiving, at said controller, a current speed of said vehicle;
   adjusting said air quality threshold corresponding to said setting in response to said current speed;
   detecting a current value of an exterior air quality parameter at an air quality sensor of said sensor system;
   comparing said current value of said air quality parameter with said air quality threshold;
   when said current value exceeds said air quality threshold, generating a first switch signal to instruct said air inlet valve to switch to said recirculation mode; and
   when said current value is less than said air quality threshold, generating a second switch signal to instruct said air inlet valve to switch to said outside air mode.

11. A method as claimed in claim 10 further comprising presenting a current status of said outside air mode and said recirculation mode on a display of said sensory system.

12. A method as claimed in claim 10 further comprising when said current speed is above a predetermined level, adjusting said air quality threshold to a lower value than when said current speed is below said predetermined level.

13. A method as claimed in claim 10 wherein said adjusting operation includes adjusting said air quality threshold after said current speed of said vehicle remains above a speed threshold for a predetermined duration.

14. A method as claimed in claim 10 wherein said vehicle includes a mode selector for manually switching to a defrost mode, and said method further comprises:

receiving, at said controller, a defrost signal when said mode selector is switched to said defrost mode; and allowing said defrost signal to override said switch signal to instruct said air inlet valve to switch between said recirculation mode and said outside air mode.

* * * * *